(12) United States Patent
Yanagi

(10) Patent No.: US 11,907,358 B2
(45) Date of Patent: Feb. 20, 2024

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

(71) Applicant: BROTHER KOGYO KABUSHIKI KAISHA, Nagoya (JP)

(72) Inventor: Satoru Yanagi, Obu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 143 days.

(21) Appl. No.: 17/457,274

(22) Filed: Dec. 2, 2021

(65) Prior Publication Data

US 2022/0171843 A1 Jun. 2, 2022

(30) Foreign Application Priority Data

Dec. 2, 2020 (JP) .................................. 2020-200527

(51) Int. Cl.
*G06F 21/45* (2013.01)
*G06F 21/00* (2013.01)

(52) U.S. Cl.
CPC ...... *G06F 21/45* (2013.01); *G06F 2221/2131* (2013.01)

(58) Field of Classification Search
CPC .......... G06F 21/30; G06F 21/31; G06F 21/33; G06F 21/34; G06F 21/44; G06F 21/45; G06F 21/604; G06F 21/608
See application file for complete search history.

(56) References Cited

U.S. PATENT DOCUMENTS

2013/0198824 A1* 8/2013 Hitchcock ........... H04L 63/0876
726/5
2018/0152336 A1 5/2018 Ando et al.

FOREIGN PATENT DOCUMENTS

JP 2010-198505 A 9/2010
JP 2018-088645 A 6/2018

* cited by examiner

*Primary Examiner* — Edward Zee
(74) *Attorney, Agent, or Firm* — Scully, Scott, Murphy & Presser, PC

(57) ABSTRACT

A communication device may receive from a server authentication information, and may register the authentication information in a memory. The communication device may send first location information in the communication device to the server. The communication device may register a first password in the memory in a case where the authentication information is received from the server and a registration request is received from the terminal device. The communication device may send the authentication information and second location information in the communication device to the server in a case where a first change instruction is obtained after the authentication information and the first password have been registered in the memory. The communication device may change the first password in the memory to a second password in a case where a change request is received from the terminal device.

15 Claims, 6 Drawing Sheets

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE

CROSS-REFERENCE TO RELATED APPLICATIONS

This application claims priority to Japanese Patent Application No. 2020-200527, filed on Dec. 2, 2020, the entire contents of which are incorporated herein by reference.

BACKGROUND

A service that uses an email address and a password as account information exists. If a user forgets the password, a server providing such a service sends an email to the email address of the user, for example. The email includes a Uniform Resource Locator (URL) for changing the password. When the user receives the e-mail in his/her own terminal, he/she sets a new password by clicking the URL in the email and accessing the server.

The above service assumes that the server is capable of sending emails. That is, information for using a mail server (e.g., an address of the mail server) is set in advance in this server. In recent years, a user password is registered in home appliances such as printers, and password authentication is often executed. In such types of home appliances, information for sending emails is not registered in advance. Due to this, if the user forgets the password in the state where this information is not registered, he/she cannot set a new password using the aforementioned method that utilizes the email.

SUMMARY

The disclosure herein discloses art that allows for suitably changing a password when a user forgets the password.

A communication device disclosed herein may comprise: a memory; and a controller. The controller may be configured to: receive from a server authentication information for the communication device to use the server; in a case where the authentication information is received from the server, register the authentication information in the memory; send first location information in the communication device to the server, the first location information being to be sent from the server to a terminal device; receive a registration request including the first location information from the terminal device which has received the first location information; in a case where the authentication information is received from the server and the registration request is received from the terminal device, register a first password in the memory; obtain a first change instruction for changing the first password without the first password being inputted after the authentication information and the first password have been registered in the memory; in a case where the first change instruction is obtained, send the authentication information and second location information in the communication device to the server, the second location information being to be sent from the server to the terminal device; receive a change request including the second location information from the terminal device which has received the second location information; and in a case where the change request is received from the terminal device, change the first password in the memory to a second password.

According to the above configuration, the communication device receives from the sever the authentication information and registers the same. Further, the communication device sends the first location information to the sever. As a result, the first location information is sent from the server to the terminal device. Further, the communication device registers the first password in the case where the authentication information is received from the server and the registration request is received from the terminal device which has received the first location information. In other words, even if a user forgets the first password, the communication device registers the first password when an environment in which the location information for changing the first password to another password can be sent from the server to the terminal device is prepared. Accordingly, in the case where the first change instruction for changing the first password without the first password being inputted is obtained, the communication device can suitably send the authentication information and the second location information in the communication device to the server, as a result of which, the second location information can be suitably sent from the server to the terminal device. Further, in the case where the change request is received from the terminal device which has received the second location information, the communication device can change the first password to the second password. As described above, the communication device can suitably change the first password to the second password when the user forgets the first password.

A computer program for the aforementioned communication device, a computer-readable medium storing the computer program and a method performed by the aforementioned communication device are also novel and useful.

Figure 1:
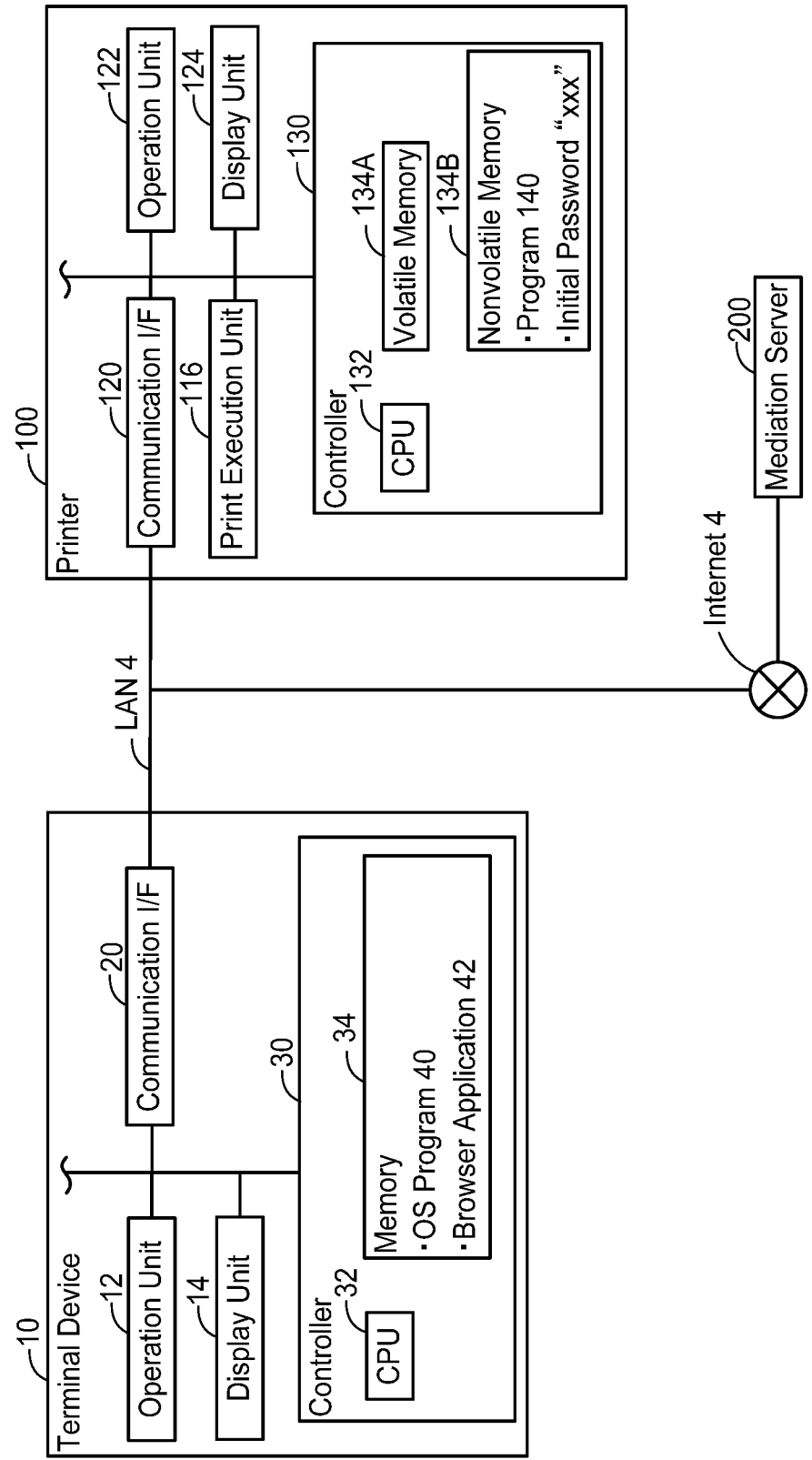
FIG. 1 shows a configuration of a communication system.

DETAILED DESCRIPTION (Configuration of Communication System 2: FIG. 1)
As shown in FIG. 1, a communication system 2 comprises a terminal device 10, a printer 100, and a mediation server 200. The terminal device 10 and the printer 100 are connected to a Local Area Network (LAN) 4 and are configured to communicate with each other through the LAN 4. The LAN 4 is connected to the Internet 6, and the mediation server 200 is established on the Internet 6. Due to this, the terminal device 10 and the printer 100 are configured to communicate with the mediation server 200 through the Internet 6. The mediation server 200 is a server for mediating various types of communication for registering a password in the printer 100. Hereinbelow, the terminal device 10 and the mediation server 200 will respectively be termed "terminal 10" and "server 200" for simpler expressions.

(Configuration of Terminal 10)
The terminal 10 may be a portable terminal such as a smartphone, a notebook PC, and a tablet PC, or may be a stationary terminal such as a desktop PC. The terminal 10 is a terminal owned by an administrator who manages the printer 100. The terminal 10 comprises an operation unit 12, a display unit 14, a communication interface 20, and a controller 30.

The operation unit 12 is buttons or a touch screen to be operated by a user. The display unit 14 is a display configured to display various types of information. The communication interface 20 is connected to the LAN 4. The controller 30 comprises a CPU 32 and a memory 34. The CPU 32 is configured to execute various processes according to programs 40, 42 stored in the memory 34. The memory 34 is configured of volatile memory, a nonvolatile memory, and the like.

An OS program 40 is a program for implementing basic operations of the terminal 10. A browser application 42 is a program for implementing webpage browser. Hereinbelow, the OS program 40 and the browser application 42 will respectively be termed "OS 40" and "browser 42" for simpler expressions.

(Configuration of Printer 100)

The printer 100 is a peripheral device configured to execute a print function (i.e., a peripheral device of the terminal 10). The printer 100 may be a multi-function peripheral configured to execute a scan function and a facsimile function in addition to the print function. In the present embodiment, the printer 100 does not have a function to communicate emails. However, in a variant, the printer 100 may have such a function. The printer 100 comprises an operation unit 122, a display 124, a print execution unit 116, a communication interface 120, and a controller 130.

The operation unit 122 is buttons or a touch screen to be operated by the user. The display unit 124 is a display configured to display various types of information. The print execution unit 116 is a print mechanism of an inkjet scheme, a laser scheme, or the like. The communication interface 120 is connected to the LAN 4. The controller 130 comprises a CPU 132, a volatile memory 134A, and a nonvolatile memory 134B. The CPU 132 is configured to execute various processes according to a program 140 stored in the nonvolatile memory 134B. At the time of shipment of the printer 100, a default password "xxx" for executing user authentication is registered in advance in the nonvolatile memory 134B.

Figure 2:
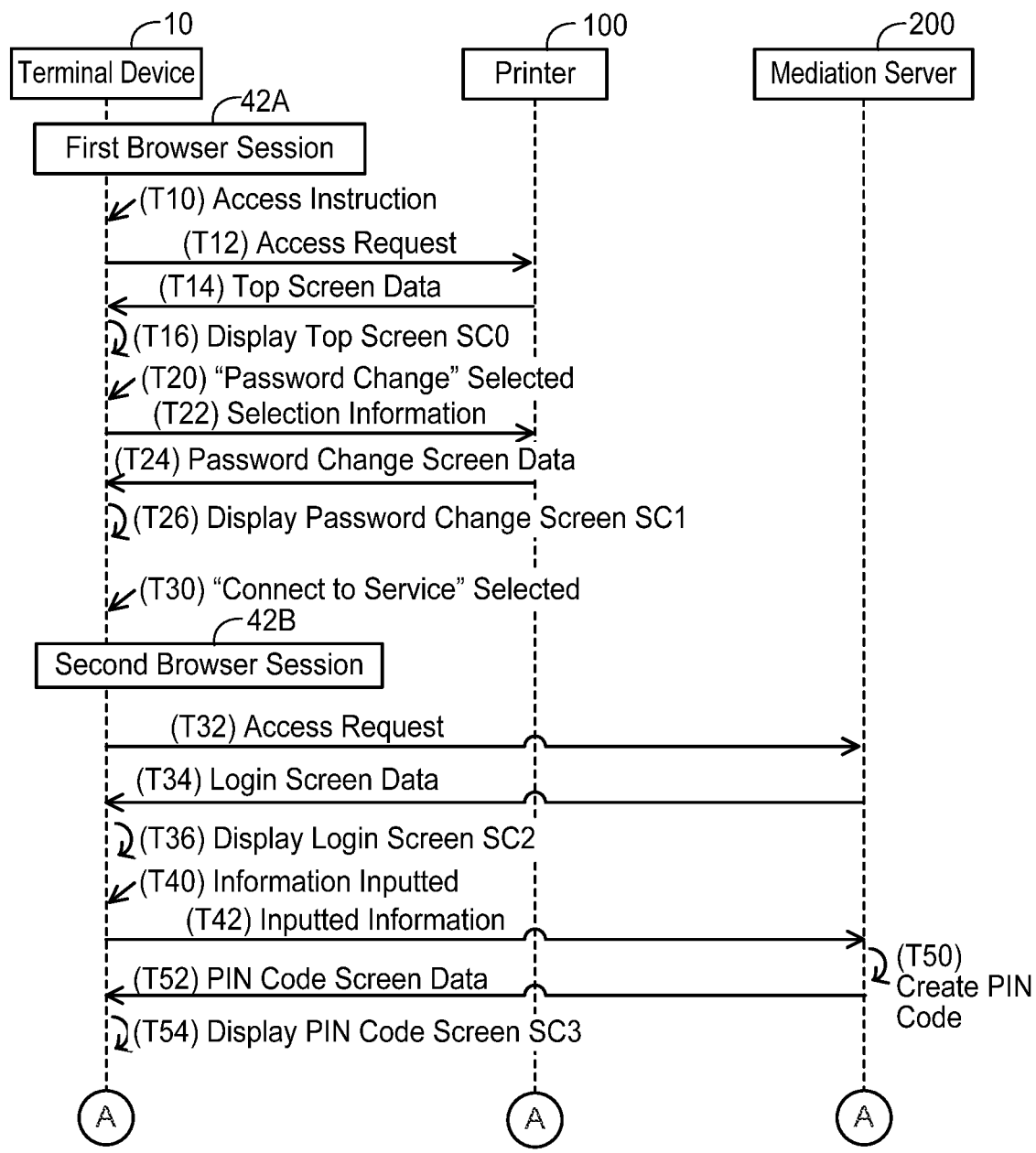
FIG. 2 shows a sequence diagram of a process executed by respective devices.

(Process Executed by Respective Devices 10, 100, 200: FIG. 2)

Next, a process executed by the respective devices 10, 100, 200 will be described with reference to FIG. 2. The following contemplates a situation in which, after the printer 100 has been shipped, the administrator accesses the printer 100 using the terminal 10 without the default password "xxx" of the printer 100 being changed. Here, the administrator has already registered account information for using the server 200 (i.e., user ID and password) in the server 200. However, information for registering a password using the server 200 (i.e., token to be described later) is not yet registered in the printer 100.

Hereinbelow, in explaining contents of the processes executed by the CPU 32 of the terminal 10, the explanation may be given with the browser 42 that executes the processes as a subject of action rather than explaining the CPU 32 as subject of action. Especially in the present embodiment, a plurality of sessions of the browser 42 is simultaneously activated, thus in explaining the contents of the processes executed by the browser 42, the explanation may be given with the browser sessions that execute the processes as the subjects of action. Here, one browser session is a session that displays one window. That is, in the state where two windows are displayed by the browser 42, for example, two browser sessions are activated.

When an operation for activating the browser 42 is performed by the administrator on the terminal 10, a first browser session 42A is activated in the terminal 10. When the first browser session 42A accepts an instruction for accessing a web server function of the printer 100 (i.e., an input of a Uniform Resource Locator (URL) of a web server in the printer 100) in T10, the first browser session 42A sends an access request to the printer 100 in T12.

When the CPU 132 of the printer 100 receives the access request from the terminal 10 in T12, the CPU 132 of the printer 100 sends top screen data representing a top screen SC0 to the terminal 10 in T14.

Figure 5:
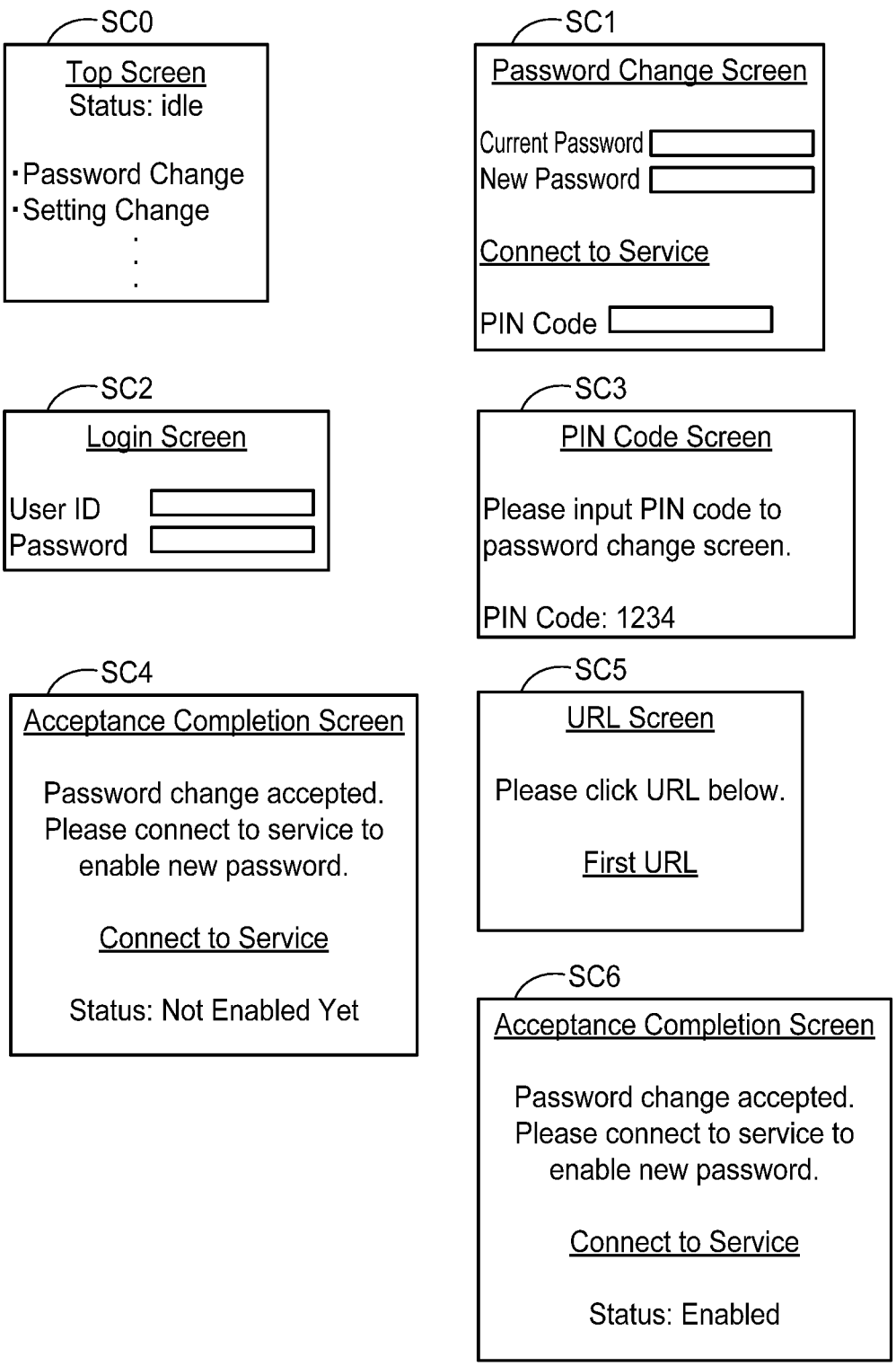
FIG. 5 shows examples of respective screens.

When the first browser session 42A receives the top screen data from the printer 100 in T14, the first browser session 42A displays the top screen SC0 in T16. As shown in FIG. 5, the top screen SC0 includes a current status of the printer 100 ("idle" in the example of FIG. 5) and a plurality of buttons for changing settings of the printer 100 (e.g., a "password change" button).

In T20, the first browser session 42A accepts selection of the "password change" button in the top screen SC0. In this case, in T22, the first browser session 42A sends to the printer 100 selection information indicating that the "password change" button has been selected.

When the CPU 132 of the printer 100 receives the selection information from the terminal 10 in T22, the CPU 132 of the printer 100 sends to the terminal 10 password change screen data representing a password change screen SC1 in T24. Due to this, the printer 100 can suitably obtain the new password inputted by the administrator to the password change screen SC1. Here, since the new password is inputted by the administrator, the administrator can input a password that is easy for him/her to remember as the new password.

When the first browser session 42A receives the password change screen data from the printer 100 in T24, the first browser session 42A displays the password change screen SC1 in T26. As shown in FIG. 5, the password change screen SC1 includes an input box for inputting a current password (i.e., the default password "xxx"), an input box for inputting a new password, a message for connecting to the server 200, and an input box for inputting a PIN code. The message is hyperlinked to the URL of the server 200.

In T30, the first browser session 42A accepts selection of the message "connect to service" in the password change screen SC1. In this case, the first browser session 42A notifies the OS 40 of the URL set in this message. As a result, a second browser session 42B different from the first browser session 42A is activated by the OS 40, and the second browser session 42B is notified of the URL from the OS 40.

In T32, the second browser session 42B sends to the server 200 an access request including the URL notified of by the OS 40 as a destination URL.

When the server 200 receives the access request from the terminal 10 in T32, the server 200 sends to the terminal 10 login screen data representing a login screen SC2 in T34.

When the second browser session 42B receives the login screen data from the server 200 in T34, the second browser session 42B displays the login screen SC2 in T36. As shown in FIG. 5, the login screen SC2 is a screen for inputting the account information for logging in to the server 200, and specifically includes an input box for inputting a user ID and an input box for inputting a password.

In T40, the second browser session 42B accepts input of the user ID and the password to the login screen SC2. In this case, the second browser session 42B sends to the server 200 inputted information including the user ID and the password in T42.

When the server 200 receives the inputted information from the terminal 10 in T42, the server 200 creates a PIN code in T50. The PIN code is information to be used in authentication for creating a token to be described later. Then, in T52, the server 200 sends the terminal 10 PIN code screen data representing a PIN code screen SC3 including the created PIN code.

When the second browser session 42B receives the PIN code screen data from the server 200 in T52, the second browser session 42B displays the PIN code screen SC3 in T54. As shown in FIG. 5, the PIN code screen SC3 includes a message prompting to input a PIN code to the password change screen SC1 and a PIN code "1234". Due to this, the administrator can acknowledge that he/she should input the PIN code "1234" to the password change screen SC1.

Figure 3:
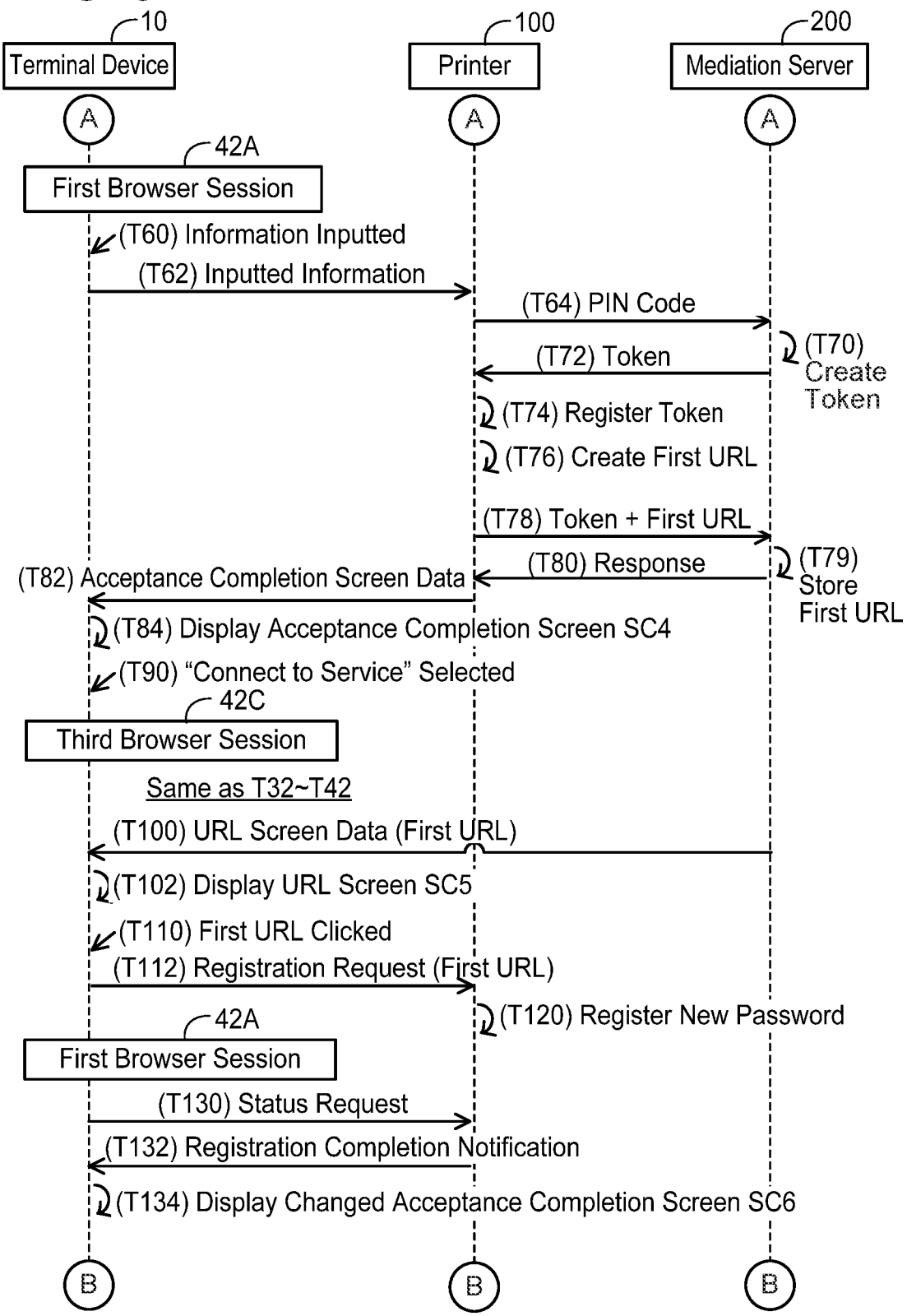
FIG. 3 shows a sequence diagram continued from FIG. 2.

(Continuation of FIG. 2: FIG. 3)

As shown in FIG. 3, the first browser session 42A accepts input of respective pieces of information to the password change screen SC1 in T60. For example, since the default password "xxx" of the printer 100 is described in a user manual of the printer 100, the administrator inputs the default password "xxx" as the current password. The administrator further inputs a password which he/she can easily remember as the new password. The administrator further inputs the PIN code "1234" included in the PIN code screen SC3 displayed in T54 of FIG. 2. When the first browser session 42A accepts the input of the respective pieces of information in T60, the first browser session 42A sends the printer 100 in T62 inputted information including the current password "xxx", the new password, and the PIN code "1234".

When the CPU 132 of the printer 100 receives the inputted information from the terminal 10 in T62, the CPU 132 of the printer 100 sends to the server 200 in T64 the PIN code "1234" included in the inputted information. As above, the printer 100 can obtain the PIN code "1234" created by the server 200 from the terminal 10 and send the PIN code "1234" to the server 200. Due to this, the printer 100 can suitably cause the server 200 to create a token to be described later.

When the server 200 receives the PIN code "1234" from the printer 100 in T64, the server 200 determines that this PIN code is the PIN code created in T50 of FIG. 2. That is, the server 200 determines that authentication of the PIN code was successful. In this case, in T70, the server 200 creates and stores a token being authentication information for the printer 100 to use the server 200, and sends the token to the printer 100 in T72. If the PIN code received from the printer 100 is not the PIN code created in T50 of FIG. 2, that is, in the case where the authentication of the PIN code fails, processes from T70 are not executed.

When the CPU 132 of the printer 100 receives the token from the server 200 in T72, the CPU 132 of the printer 100 registers the token in the nonvolatile memory 134B in T74. Due to this, the printer 100 can change the password by accessing the server 200 using the token if the administrator should ever forget the password.

Next, in T76, the CPU 132 creates a first URL. The first URL is a URL including a domain of the printer 100, that is, a URL indicating a location within the printer 100. Although details will be described later, the first URL is a URL used in authentication for registering the new password as a replacement to the current password. Further, in T78, the CPU 132 sends to the server 200 the token and the first URL.

When the server 200 receives the token and the first URL from the printer 100 in T78, the server 200 determines that the token is the token that is already stored (see T70). That is, the server 200 determines that authentication of the token was successful. In this case, the server 200 stores the first URL in T79 and sends to the printer 100 in T80 a response indicating that the first URL has been stored.

When the CPU 132 of the printer 100 receives the response from the server 200 in T80, the CPU 132 of the printer 100 sends to the terminal 10 in T82 acceptance completion screen data representing an acceptance completion screen SC4.

When the first browser session 42A receives the acceptance completion screen data from the printer 100 in T82, the first browser session 42A displays the acceptance completion screen SC4 in T84. As shown in FIG. 5, the acceptance completion screen SC4 includes a message indicating that the password change has been accepted, a message prompting to connect to the server 200 and enable the new password, and a message for connecting to the server 200. The message for connecting to the server 200 is hyperlinked to the URL of the server 200. The acceptance completion screen SC4 further includes a message indicating a status showing whether the password change has been completed. Here, the status indicates that the password change has not yet been completed. Due to this, the administrator can acknowledge that the password change has not yet been completed.

In T90, the first browser session 42A accepts selection of the "connect to service" message in the acceptance completion screen SC4. In this case, the first browser session 42A notifies the OS 40 of the URL set to this message. As a result, a third browser session 42C different from the first and second browser sessions 42A, 42B is activated by the OS 40, and the third browser session 42C is notified of the URL from the OS 40. Due to this, the third browser session 42C executes the same processes as T32 to T42 of FIG. 2.

When the server 200 receives the inputted information including the user ID and the password from the terminal 10 (see T42 of FIG. 2 as applied to FIG. 3), in T100 the server 200 sends to the terminal 10 URL screen data representing a URL screen SC5 including the first URL stored in T79.

When the third browser session 42C receives the URL screen data from the server 200 in T100, the third browser session 42C displays the URL screen SC5 in T102. As shown in FIG. 5, the URL screen SC5 includes a message prompting to click the first URL and the first URL to which a hyperlink is set.

When the third browser session 42C accepts an operation of clicking the first URL in the URL screen SC5 in T110, in T112 the third browser session 42C sends to the printer 100 a registration request including the first URL as a destination URL.

When the CPU 132 of the printer 100 receives the registration request from the terminal 10 in T112, the CPU 132 of the printer 100 determines that the first URL is the URL created in T76. That is, the CPU 132 determines that authentication of the URL was successful. In this case, in T120, the CPU 132 registers the new password received in T62 in the nonvolatile memory 134B as a replacement to the default password "xxx".

After having displayed the acceptance completion screen SC4 in T84, the first browser session 42A repeats sending a status request (e.g., see T130) to the printer 100. The status request is a request for inquiring whether the password change has been completed.

After registration of the new password is completed (see T120), the CPU 132 of the printer 100 receives the status request from the terminal 10 in T130. In this case, the CPU 132 sends to the terminal 10 a registration completion notification in T132.

When the first browser session 42A receives the registration completion notification from the printer 100 in T132, the first browser session 42A changes the acceptance completion screen SC4 in T134. Specifically, the first browser session 42A changes the message indicating that the password change has not yet been completed to a message indicating that the password change has been completed as the status included in the acceptance completion screen SC4. Due to this, an acceptance completion screen SC6 after the change is displayed. As shown in FIG. 5, the acceptance completion screen SC6 after the change includes the message indicating that the password change has been completed. Due to this, the administrator can acknowledge that the password change has been completed.

After the password change is completed, the administrator selects a "setting change" button in the top screen SC0, and inputs the password registered in T120 in a login screen for inputting a password (see SC7 in FIG. 6 to be described later). In this case, the administrator can change various settings of the printer 100 (e.g., communication setting, default print setting).

Figure 4:
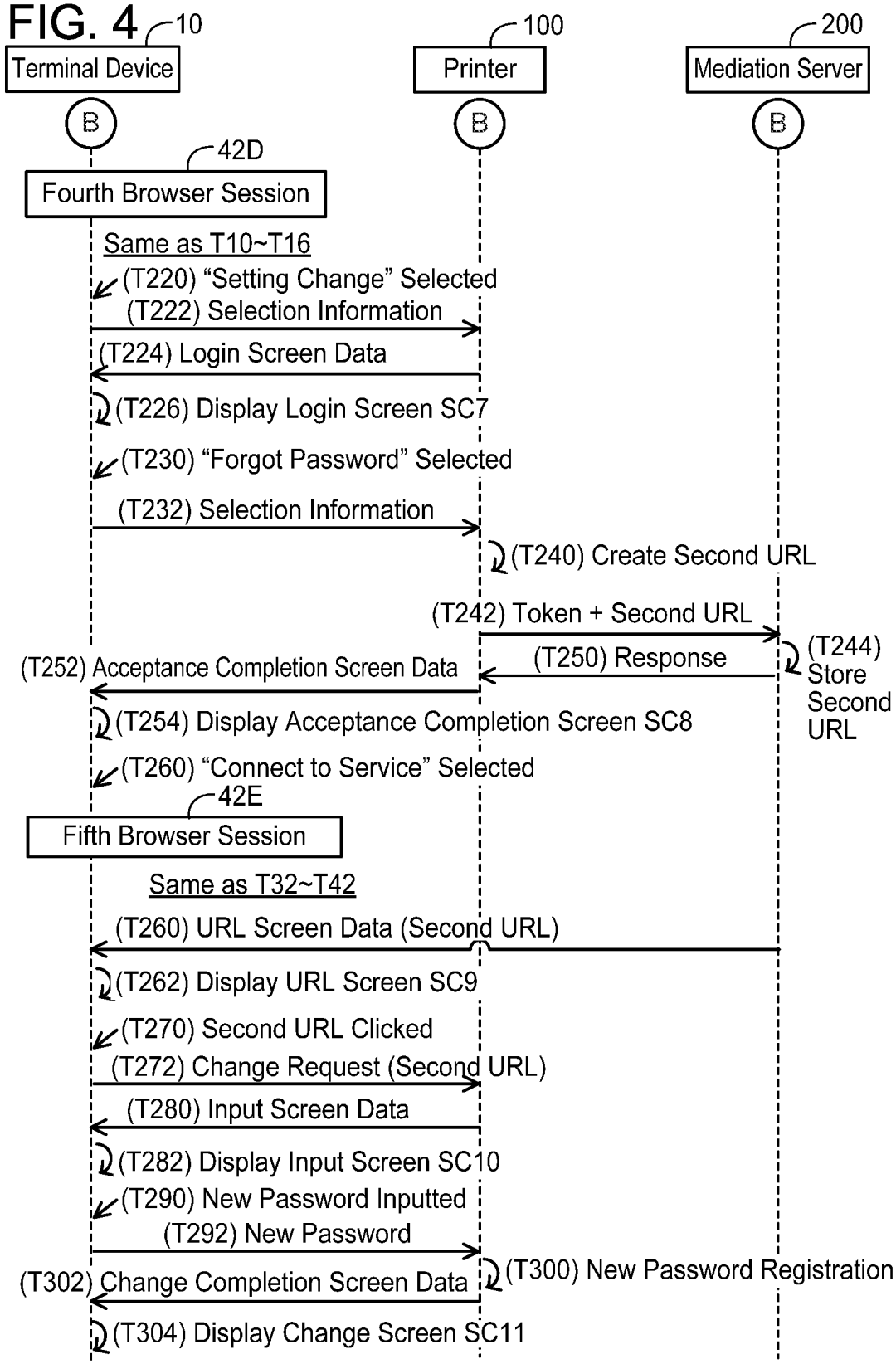
FIG. 4 shows a sequence diagram continued from FIG. 3.

(Continuation of FIG. 3: FIG. 4)

Next, a case in which the administrator forgets the password registered in T120 of FIG. 3 will be described with reference to FIG. 4. When the operation for activating the browser 42 is performed on the terminal 10 by the administrator, a fourth browser session 42D is activated in the terminal 10. After this, the same operations and processes as T10 to T16 of FIG. 2 are executed.

In T220, the fourth browser session 42D accepts selection of the "setting change" button in the top screen SC0. In this case, the fourth browser session 42D sends the printer 100 in T222 selection information indicating that the "change settings" button has been selected.

When the CPU 132 of the printer 100 receives the selection information from the terminal 10 in T222, in T224 the CPU 132 of the printer 100 sends to the terminal 10 login screen data representing a login screen SC7.

When the fourth browser session 42D receives the login screen data from the printer 100 in T224, the fourth browser session 42D displays the login screen SC7 in T226. As shown in FIG. 6, the login screen SC7 includes an input box for inputting a password and a message indicating that the user forgot the password. This message is hyperlinked to a URL to request the password change.

In T230, the fourth browser session 42D accepts selection of the message indicating that the user forgot the password in the login screen SC7. In this case, the fourth browser session 42D sends the printer 100 in T232 selection information indicating that this message has been selected. This selection information includes the URL to which the message is hyperlinked as its destination URL.

In T232, the CPU 132 of the printer 100 receives the selection information from the terminal 10. As above, when the message in the login screen SC7 is selected, the printer 100 can suitably obtain an instruction for changing the password by receiving the selection information from the terminal 10.

Next, in T240, the CPU 132 creates a second URL. The second URL is a URL indicating a location within the printer 100 and is different from the aforementioned first URL. In a variant, the second URL may be the same as the first URL. Although details will be described later, the second URL is a URL used in authentication for registering the new password as a replacement to the current password (i.e., the password registered in T120 of FIG. 3). Then in T242, the CPU 132 sends to the server 200 the token in the nonvolatile memory 134B (see T74 of FIG. 3) and the second URL.

When the server 200 receives the token and the second URL from the printer 100 in T242, the server 200 determines that the token is the token that is already stored (see T70 of FIG. 3). That is, the server 200 determines that authentication of the token was successful. In this case, the server 200 stores the second URL in T244 and in T250 sends to the printer 100 a response indicating that the second URL has been stored.

When the CPU 132 of the printer 100 receives the response from the server 200 in T250, in T252 the CPU 132 of the printer 100 sends to the terminal 10 acceptance completion screen data representing an acceptance completion screen SC8.

When the fourth browser session 42D receives the acceptance completion screen data from the printer 100 in T252, the fourth browser session 42D displays the acceptance completion screen SC8 in T254. As shown in FIG. 6, the acceptance completion screen SC8 is the same as the acceptance completion screen SC4 of FIG. 5 except that it does not include the message indicating the status.

In T260, the fourth browser session 42D accepts selection of the "connect to service" message in the acceptance completion screen SC8. In this case, the fourth browser session 42D notifies the OS 40 of the URL set to this message. As a result, a fifth browser session 42E different from the fourth browser session 42D is activated by the OS 40, and the fifth browser session 42E is notified of the URL from the OS 40. Due to this, the fifth browser session 42E executes the same processes as T32 to T42 of FIG. 2.

When the server 200 receives the inputted information including the user ID and the password from the terminal 10 (see T42 of FIG. 2 applied to FIG. 4), in T260 the server 200 sends to the terminal 10 URL screen data representing a URL screen SC9 including the second URL stored in T244.

When the fifth browser session 42E receives the URL screen data from the server 200 in T260, the fifth browser session 42E displays the URL screen SC9 in T262. As shown in FIG. 6, the URL screen SC9 includes a message prompting to click the second URL and the second URL to which a hyperlink is set.

When the fifth browser session 42E accepts an operation of clicking the second URL in the URL screen SC9 in T270, in T272 the fifth browser session 42E sends to the printer 100 a change request including the second URL as a destination URL.

When the CPU 132 of the printer 100 receives the change request from the terminal 10 in T272, the CPU 132 of the printer 100 determines that the second URL is the URL created in T240. That is, the CPU 132 determines that the authentication of the URL was successful. In this case, in T280, the CPU 132 sends to the terminal 10 input screen data representing an input screen SC10. Due to this, the printer 100 can suitably obtain a new password to be inputted to the input screen SC10 by the administrator. Here, since the new password is imputed by the administrator. the administrator can input a password which he/she can easily remember as the new password.

When the fifth browser session 42E receives the input screen data from the printer 100 in T280, the fifth browser session 42E displays the input screen SC10 in T282. As shown in FIG. 6, the input screen SC10 includes an input box for inputting a new password.

In T290, the fifth browser session 42E accepts input of a new password to the input screen SC10. In this case, the fifth browser session 42E sends to the printer 100 the new password in T292.

When the CPU 132 of the printer 100 receives the new password from the terminal 10 in T292, the CPU 132 of the printer 100 registers the new password in the nonvolatile memory 134B in T300 as a replacement to the current password.

After registration of the new password is completed, in T302 the CPU 132 of the printer 100 sends to the terminal 10 change completion screen data representing a change completion screen SC11.

When the fifth browser session 42E receives the change completion screen data from the printer 100 in T302, the fifth browser session 42E displays the change completion screen SC11 in T304. The change completion screen SC11 includes a message indicating that the password change has been completed. Due to this, the administrator can acknowledge that the password change has been completed.

(Effects of Present Embodiment)

According to the present embodiment, prior to registering the new password as the replacement to the default password "xxx", the printer 100 receives the token from the server 200 (T72 of FIG. 3) and registers this token (T74). Further, the printer 100 sends the first URL to the server 200 (T78). As a result, the first URL is sent from the server 200 to the terminal 10 (T100). Further, the printer 100 registers the new password (T120) in the case where the printer 100 receives the registration request from the terminal 10 that has received the first URL (T112). That is, even if the administrator forgets the new password, the printer 100 registers the new password when an environment in which the URL for changing this new password to another password can be sent from the server 200 to the terminal 10 is prepared. As such, the printer 100 can suitably send the token and the second URL to the server 200 (T242) when it obtains the instruction for changing the password (T232 of FIG. 4) without input of the password registered in T120, as a result of which it can cause the server 200 to suitably send the second URL to the terminal 10. Further, the printer 100 can change this password to another password (T300) when it receives the change request from the terminal 10 that has received the second URL (T272). As above, the printer 100 can suitably change the current password to another password when the administrator forgets the current password.

(Corresponding Relationships)

The printer 100 is an example of "communication device". The token and the PIN code are respectively an example of "authentication information" and "code information". The first URL and the second URL are respectively an example of "first location information" and "second location information". The password registered in T120 of FIG. 3, the password registered in T300 of FIG. 4, and the default password "xxx" are respectively an example of "first password", "second password", and "third password". The selection information in T232 of FIG. 4 and the selection information in T22 of FIG. 2 are respectively an example of "first change instruction" and "second change instruction".

The password change screen data in T24 of FIG. 2 and the password change screen SC1 in FIG. 5 are respectively an example of "first input screen data" and "first input screen".

Figure 6:
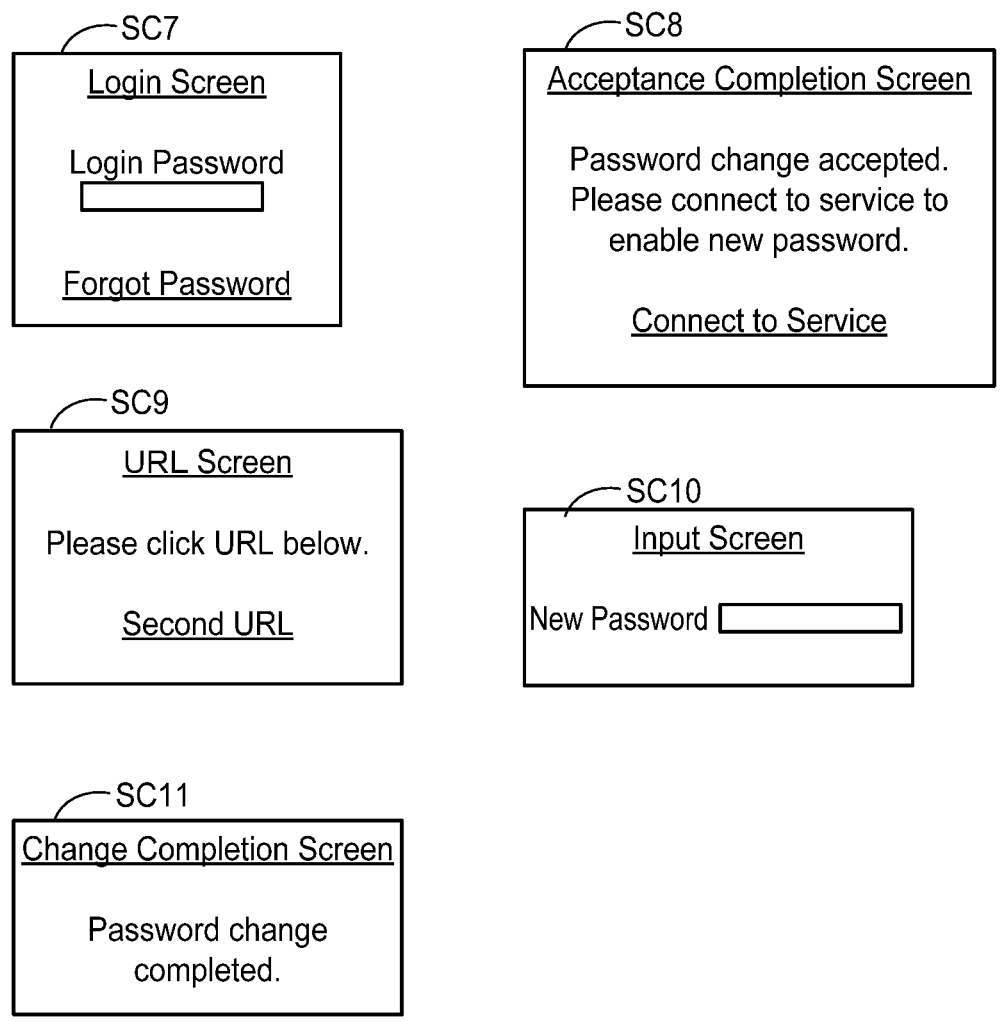
FIG. 6 shows examples of respective screens.

The login screen data of T224 of FIG. 4 and the login screen SC7 of FIG. 6 are respectively an example of "second input screen data" and "second input screen". The message "forgot password" in the login screen SC7 is an example of "predetermined area". The input screen data in T280 of FIG. 4 and the input screen SC10 of FIG. 6 are respectively an example of "third input screen data" and "third input screen".

The process of T24 of FIG. 2 is an example of "send to the terminal device first input screen data". The process of T72, the process of T74, the process of T78, the process of T82, the process of T112, the process of T120, and the process of T132 of FIG. 3 are respectively an example of "receive from a server authentication information", "register the authentication information", "send first location information", "notify that the first password has not been registered yet", "receive a registration request", "register a first password", and "notify that the first password has been registered". The process of T62 is an example of "obtain the first password" and "obtain code information". The process of T64 is an example of "send the code information".

The process of T224, the process of T232, the process of T242, the process of T272, the process of T280, the process of T292, and the process of T300 of FIG. 4 are respectively an example of "send to the terminal device second input screen data", "obtain a first change instruction", "send the authentication information and second location information", "receive a change request", "send to the terminal device third input screen data", "obtain the second password", and "change the first password in the memory to a second password".

(Variant 1) The printer 100 may create the first URL in T64 of FIG. 3 and may send the PIN code and the first URL to the server 200. In this case, the server 200 creates the token in T70 and stores the token and the first URL. In this variant, T76 to T80 may be omitted. In general terms, "send first location information" may include sending the first location information to the server prior to receiving the authentication information from the server.

(Variant 2) The password change screen SC1 displayed in T26 of FIG. 2 may not include the input box for inputting a new password. In this case, the printer 100 may obtain the new password by accepting an input operation by the administrator on the operation unit 112. In general terms, "obtain the first password" may not receive the first password from the terminal device. In another variant, the printer 100 may create the new password without obtaining the password inputted by the administrator, and may provide the created new password to the administrator. In this variant, "obtain the first password" may be omitted.

(Variant 3) The password change screen SC1 displayed in T26 of FIG. 2 may not include the input box for inputting a new password. In this case, the printer 100 may send screen data representing a screen for inputting a new password to the terminal 10 after having received the token from the server 200 in T72 of FIG. 3, and may obtain the new password inputted by the administrator from the terminal 10. In general terms, "obtain the first password" may obtain the first password after the authentication information has been received from the server.

(Variant 4) The printer 100 may obtain the PIN code by accepting an input operation on the operation unit 112 by the administrator. In general terms, "obtain code information" may not receive the code information from the terminal device, and may obtain the code information using another means for obtaining the same.

(Variant 5) The password change screen SC1 displayed in T26 of FIG. 2 may not include the input box for inputting a PIN code. In this case, T50 to T54 of FIG. 2 are omitted and the PIN code is not sent to the printer 100. For example, in T40 of FIG. 2, printer identification information for identifying the printer 100 may be inputted in addition to the user ID and the password, and this printer identification information may also be sent to the server 200 in T42. After having sent the password change screen data to the terminal 10 in T24 of FIG. 2, the printer 100 repeats to send the printer identification information to the server 200. The server 200 may create a token in the case where the printer 100 receives the printer identification information after having received the printer identification information from the terminal 10 in T42, and may send this token to the printer 100. In this variant, "obtain code information" and "send the code information" may be omitted.

(Variant 6) The printer 100 may not store the default password. In this case, in T24 of FIG. 2, the printer 100 sends to the terminal 10 the password change screen data representing the password change screen not including the input box for inputting the current password. In general terms, the third password may not be registered in advance in the memory at the time of shipment of the communication device.

(Variant 7) The acceptance completion screens SC4 and SC6 in FIG. 5 may not include the message indicating the status. In this variant, "notify that the first password has not been registered yet" and "notify that the first password has been registered" may be omitted.

(Variant 8) The printer 100 may obtain the change instruction for changing the password by accepting a password changing operation by the administrator on the operation unit 112 instead of T220 to T232 of FIG. 4. In this variant, "send to the terminal device second input screen data" may be omitted.

(Variant 9) The printer 100 may obtain the new password by accepting an input operation by the administrator on the operation unit 112 instead of T280 to T292 of FIG. 4. In general terms, "obtain the second password" may not receive the second password from the terminal device. Further, in this variant, "send to the terminal device third input screen data" may be omitted. In another variant, the printer 100 may create the new password without obtaining the password inputted by the administrator and provide the created new password to the user. In this variant, "obtain the second password" may be omitted.

(Variant 10) In the above embodiment, the respective processes of FIGS. 2 to 4 are executed by the CPU 132 of the printer 100 executing the program 140 (i.e., software). Instead of this, at least one of the processes may be executed by hardware such as a logic circuit.

What is claimed is:

1. A communication device comprising:
a memory; and
a controller,
wherein the controller is configured to:
receive authentication information from a server for the communication device to use the server;
in a case where the authentication information is received from the server, register the authentication information in the memory;
send first location information in the communication device to the server, the first location information being to be sent from the server to a terminal device;
receive a registration request including the first location information from the terminal device which has received the first location information;
in a case where the authentication information is received from the server and the registration request is received from the terminal device, register a first password in the memory;
obtain a first change instruction for changing the first password without the first password being inputted after the authentication information and the first password have been registered in the memory;
in a case where the first change instruction is obtained, send the authentication information and second location information in the communication device to the server, the second location information being to be sent from the server to the terminal device;
receive a change request including the second location information from the terminal device which has received the second location information; and
in a case where the change request is received from the terminal device, change the first password in the memory to a second password.

2. The communication device as in claim 1, wherein in a case where the authentication information is received from the server, the controller is configured to send the authentication information and the first location information to the server.

3. The communication device as in claim 1, wherein the controller is further configured to:
obtain the first password inputted by a user.

4. The communication device as in claim 3, wherein the controller is configured to obtain the first password before the authentication information is received from the server.

5. The communication device as in claim 1, wherein the controller is further configured to:
send to the terminal device, first input screen data representing a first input screen for inputting the first password,
wherein the controller is configured to obtain the first password by receiving the first password from the terminal device due to the first password being inputted by a user to the first input screen displayed on the terminal device.

6. The communication device as in claim 1, wherein the controller is further configured to:
obtain code information after the code information created by the server has been sent from the server to the terminal device; and
in a case where the code information is obtained, send the code information to the server,
wherein the controller is configured to receive the authentication information from the server in response to the code information being sent to the server.

7. The communication device as in claim 1, wherein a third password is registered in the memory in advance at a time of shipment of the communication device, and in a case where a second change instruction for changing the third password is obtained in a state where the third password is registered in the memory, the controller is configured to receive the authentication information from the server.

8. The communication device as in claim 7, wherein the controller is further configured to:

notify that the first password has not been registered yet after the first location information has been sent to the server and before the registration request is received from the terminal device.

9. The communication device as in claim 8, wherein the controller is further configured to:

in a case where the first password is registered in the memory after it has been notified that the first password has not been registered yet, notify that the first password has been registered.

10. The communication device as in claim 1, wherein the controller is further configured to:

in a case where the first password is registered in the memory, notify that the first password has been registered.

11. The communication device as in claim 1, wherein the controller is further configured to:

send, to the terminal device, second input screen data representing a second input screen for inputting the first password after the authentication information and the first password have been registered in the memory, wherein in a case where a predetermined area in the second input screen displayed on the terminal device is selected by the user without the first password being inputted by a user to the second input screen, the controller is configured to obtain the first change instruction by receiving the first change instruction from the terminal device.

12. The communication device as in claim 1, wherein the controller is further configured to:

obtain the second password inputted by a user.

13. The communication device as in claim 12, wherein the controller is further configured to:

in a case where the change request is received from the terminal device, send to the terminal device, third input screen data representing a third input screen for inputting the second password, wherein in a case where the second password is inputted by the user to the third input screen displayed on the terminal device, the controller is configured to obtain the second password by receiving the second password from the terminal device.

14. A non-transitory computer-readable recording medium storing computer-readable instructions for a communication device, wherein the computer-readable instructions, when executed by a processor of the communication device, cause the communication device to:

receive authentication information from a server for the communication device to use the server;

in a case where the authentication information is received from the server, register the authentication information in a memory;

send first location information in the communication device to the server, the first location information being to be sent from the server to a terminal device;

receive a registration request including the first location information from the terminal device which has received the first location information;

in a case where the authentication information is received from the server and the registration request is received from the terminal device, register a first password in the memory;

obtain a first change instruction for changing the first password without the first password being inputted after the authentication information and the first password have been registered in the memory;

in a case where the first change instruction is obtained, send the authentication information and second location information in the communication device to the server, the second location information being to be sent from the server to the terminal device;

receive a change request including the second location information from the terminal device which has received the second location information; and in a case where the change request is received from the terminal device, change the first password in the memory to a second password.

15. A method performed by a communication device, the method comprising:

receiving authentication information from a server for the communication device to use the server;

in a case where the authentication information is received from the server, registering the authentication information in a memory;

sending first location information in the communication device to the server, the first location information being to be sent from the server to a terminal device;

receiving a registration request including the first location information from the terminal device which has received the first location information;

in a case where the authentication information is received from the server and the registration request is received from the terminal device, registering a first password in the memory;

obtaining a first change instruction for changing the first password without the first password being inputted after the authentication information and the first password have been registered in the memory;

in a case where the first change instruction is obtained, sending the authentication information and second location information in the communication device to the server, the second location information being to be sent from the server to the terminal device;

receiving a change request including the second location information from the terminal device which has received the second location information; and in a case where the change request is received from the terminal device, changing the first password in the memory to a second password.

* * * * *